United States Patent [19]
Ina et al.

[11] Patent Number: 6,139,763
[45] Date of Patent: Oct. 31, 2000

[54] POLISHING COMPOSITION AND POLISHING METHOD EMPLOYING IT

[75] Inventors: Katsuyoshi Ina; Tadahiro Kitamura; Tomohide Kamiya; Satoshi Suzumura, all of Aichi, Japan

[73] Assignee: Fujimi Incorporated, Nishikasugai-gun, Japan

[21] Appl. No.: 09/451,778

[22] Filed: Dec. 1, 1999

[30] Foreign Application Priority Data

Dec. 1, 1998 [JP] Japan ................................. 10-342106

[51] Int. Cl.⁷ ................................. C23F 1/18; C23F 1/30
[52] U.S. Cl. ............................. 216/89; 216/99; 216/106; 134/1.3; 510/398; 510/507; 510/511; 252/79.1
[58] Field of Search ................................. 510/175, 176, 510/178, 372, 397, 398, 507, 508, 511; 252/79.1; 134/1.3; 216/89, 99, 106

[56] References Cited

U.S. PATENT DOCUMENTS

| | | | |
|---|---|---|---|
| 5,366,542 | 11/1994 | Yamada et al. | 106/3 |
| 5,575,885 | 11/1996 | Hirabayashi et al. | 438/614 |
| 5,736,495 | 4/1998 | Bolkan et al. | 510/202 |
| 5,770,095 | 6/1998 | Sasaki et al. | 216/38 |
| 5,897,375 | 4/1999 | Watts et al. | 438/693 |
| 5,980,775 | 11/1999 | Grumbine et al. | 252/79.1 |
| 5,993,686 | 11/1999 | Streinz et al. | 252/79.3 |
| 6,001,730 | 12/1999 | Farkas et al. | 438/627 |

FOREIGN PATENT DOCUMENTS

| | | |
|---|---|---|
| 0 520 109 | 12/1992 | European Pat. Off. . |
| 0 747 939 A2 | 12/1996 | European Pat. Off. . |
| 0 747 939 A3 | 12/1996 | European Pat. Off. . |
| WO 97/43087 | 11/1997 | WIPO . |

*Primary Examiner*—Gregory R. Delcotto
*Attorney, Agent, or Firm*—Oblin, Spivak, McClelland, Maier & Neustadt, P.C.

[57] ABSTRACT

A polishing composition comprising the following components:

(a) an abrasive,
(b) an oxidizing agent capable of oxidizing tantalum,
(c) a reducing agent capable of reducing tantalum oxide, and
(d) water.

15 Claims, No Drawings

POLISHING COMPOSITION AND POLISHING METHOD EMPLOYING IT

BACKGROUND OF THE INVENTION

1. Field of the Invention

The present invention relates to a polishing composition to be used for polishing substrates for semiconductors, photomasks and various memory hard disks, particularly to a polishing composition useful for polishing for planarization of the surface of device wafers in e.g. semiconductor industry, and a polishing method employing such a composition.

More particularly, the present invention relates to a polishing composition which is highly efficient and provides high selectivity in the polishing of semiconductor devices to which so-called chemical and mechanical polishing (CMP) technology is applied, in the processing of device wafers, and a polishing method employing such a composition.

2. Discussion of Background

Progress of so-called high technology products including computers has been remarkable in recent years, and parts to be used for such products, such as ULSI, have been developed for high integration and high speed, year after year. Along with such progress, the design rule for semiconductor devices has been progressively refined year after year, the depth of focus in a process for producing devices tends to be shallow, and planarization required for the pattern-forming surface tends to be increasingly severe.

Further, to cope with an increase in resistance of the wiring due to refinement of the wiring, it has been studied to employ copper instead of tungsten or aluminum, as the wiring material.

By its nature, copper is hardly processable by etching, and accordingly, it requires the following process. Namely, after forming wiring grooves and vias on an insulating layer, copper wirings are formed by sputtering or plating, and then an unnecessary copper layer deposited on the insulating layer is removed by chemical mechanical polishing (hereinafter referred to as CMP) which is a combination of mechanical polishing and chemical polishing.

However, in such a process, it may happen that copper atoms will diffuse into the insulating layer to deteriorate the device properties. Therefore, for the purpose of preventing diffusion of copper atoms, it has been studied to provide a barrier layer on the insulating layer having wiring grooves or vias formed. As a material for such a barrier layer, metal tantalum or a tantalum-containing compound (hereinafter will generally be referred to as a tantalum-containing compound) is most suitable also from the viewpoint of the reliability of the device and is expected to be employed mostly in the future.

Accordingly, in such a CMP process for a semiconductor device containing such a copper layer and a tantalum-containing compound, firstly the copper layer as the outermost layer and then the tantalum-containing compound layer as the barrier layer, are polished, respectively, and polishing will be completed when it has reached the insulating layer of e.g. silicon dioxide or silicon trifluoride. As an ideal process, it is desired that by using only one type of a polishing composition, the copper layer and the tantalum-containing compound layer are uniformly removed by polishing in a single polishing step, and polishing will be completed certainly when it has reached the insulating layer. However, copper and a tantalum-containing compound are different in their hardness, chemical stability and other mechanical properties and accordingly in the processability, and thus, it is difficult to adopt such an ideal polishing process. Accordingly, the following two step polishing process, i.e. polishing process divided into two steps, is being studied.

Firstly, in the first polishing step (hereinafter referred to as the first polishing), using a polishing composition capable of polishing a copper layer at a high efficiency, the copper layer is polished using e.g. a tantalum-containing compound layer as a stopper until such a tantalum-containing compound layer is reached. Here, for the purpose of not forming various surface damages such as recesses, erosion, dishing, etc., on the copper layer surface, polishing may be terminated immediately before reaching the tantalum-containing compound layer i.e. while a copper layer still slightly remains. Then, in the second polishing step (hereinafter referred to as the second polishing), using a polishing composition capable of polishing mainly a tantalum containing layer at a high efficiency, the remaining thin copper layer and the tantalum-containing compound layer are continuously polished using the insulating layer as a stopper, and polishing is completed when it has reached the insulating layer.

The polishing composition to be used in the first polishing is required to have a property such that it is capable of polishing the copper layer at a high stock removal rate without forming the above-mentioned various surface defects on the copper layer surface, which can not be removed by the second polishing.

With respect to such a polishing composition for a copper layer, for example, JP-A-7-233485 discloses a polishing liquid for a copper type metal layer, which comprises at least one organic acid selected from the group consisting of aminoacetic acid and amidesulfuric acid, an oxidizing agent and water, and a method for producing a semiconductor device using such a polishing liquid. If this polishing liquid is used for polishing a copper layer, a relatively high stock removal rate is obtainable. It is believed that copper atoms on the copper layer surface be oxidized by the action of the oxidizing agent, and the oxidized copper elements are taken into a chelate compound, whereby a high stock removal rate can be obtained.

However, as a result of the experiments conducted by the present inventors, it has been found that in polishing a semiconductor device comprising a copper layer and a tantalum-containing compound layer, the polishing liquid of JP-A-7-233485 is effective as a polishing composition mainly for a copper layer i.e. for the first polishing, but it is hardly useful mainly for a tantalum-containing compound layer i.e. for the second polishing, because the tantalum-containing compound is susceptible to oxidation by an oxidizing agent such as hydrogen peroxide, an iron salt or even water, and besides, the oxidized layer tends to be very hard and can not easily be polished. Namely, this oxidized layer (ditantalum pentoxide) is a very hardly polishable material, whereby polishing will not proceed even by polishing by means of a large amount of an oxidizing agent. Further, there has been a problem that due to the strong ferroelectricity of such oxidized layer, self-discharge is likely to occur during polishing, whereby explosive chipping of the tantalum-containing compound layer is likely to occur frequently. Whereas, a copper layer is relatively easily polished, and the stock removal rate against the copper layer is higher than the stock removal rate against the tantalum compound, whereby surface damages such as recesses, dishing, erosion, etc., have been likely to form.

On the other hand, a method of mechanically polishing a tantalum-containing compound layer without relying on the chemical action, is also being studied. In a polishing composition to be used for this purpose, a relatively hard abrasive such as aluminum oxide, silicon nitride or silicon carbide may be used, and the content of such an abrasive may be increased. However, if a composition containing a large amount of such an abrasive, is used for polishing, although the stock removal rate against the tantalum-containing compound layer may increase to some extent, the stock removal rate against the insulating layer also increases at the same time. Accordingly, the ratio (hereinafter referred to as "the selectivity ratio") of the stock removal rate of the insulating layer to the tantalum-containing compound layer, tends to be very small, and consequently, the yield of the device tends to decrease. Further, if such a composition is used for polishing, the usage life of the polishing pad is likely to be shortened, thus leading to a problem from the viewpoint of the production cost.

SUMMARY OF THE INVENTION

The present invention has been made to solve the above-described problems. Namely, it is an object of the present invention to provide a polishing composition which is capable of polishing a tantalum-containing compound layer at a high stock removal rate.

The present invention provides a polishing composition comprising the following components:

(a) an abrasive, (b) an oxidizing agent capable of oxidizing tantalum, (c) a reducing agent capable of reducing tantalum oxide, and (d) water.

Further, the present invention provides a polishing method for polishing a semiconductor device having a layer of copper and a layer of a tantalum-containing compound formed on a substrate, by means of a polishing composition comprising the following components:

(a) an abrasive, (b) an oxidizing agent capable of oxidizing tantalum, (c) a reducing agent capable of reducing tantalum oxide, and (d) water.

According to the present invention, the tantalum-containing compound layer can be polished at a high stock removal rate. Further, according to one embodiment, the present invention provides a polishing composition whereby, in the CMP process for producing a semiconductor device comprising a copper layer and a tantalum-containing compound layer on a substrate, the stock removal rate against the copper layer and the tantalum-containing compound layer is high, while the stock removal rate against a silicon dioxide layer, a silicon nitride layer, a BPSG layer and other insulating layers, is low, i.e. the selectivity ratio is high, and a polishing method employing such a composition. According to another embodiment, the present invention provides a polishing composition whereby, in the CMP process for producing a semiconductor device comprising a copper layer and a tantalum-containing compound layer on a substrate, the polishing rate against the tantalum-containing compound layer is high, while the stock removal rate against the copper layer is low, and a polishing method employing such a composition.

By means of such polishing compositions and polishing methods, in a process for producing the above-mentioned semiconductor device, it is possible to produce the semiconductor device in good yield.

DETAILED DESCRIPTION OF THE PREFERRED EMBODIMENTS

Abrasive

In the polishing composition of the present invention, the abrasive has a role as so-called abrasive grains and serves to perform mechanical polishing in the CMP processing. Namely, the abrasive is one having an action to mechanically remove a brittle layer formed on the surface to be polished, by various compound components which will be described hereinafter.

The polishing composition of the present invention contains, as an abrasive, at least one member selected from the group consisting of silicon dioxide, aluminum oxide, cerium oxide, titanium oxide, silicon nitride, zirconium oxide, silicon carbide and manganese dioxide.

Among them, silicon dioxide includes colloidal silica, fumed silica and various other types different in the nature or the method for preparation.

Aluminum oxide also includes α-alumina, δ-alumina, θ-alumina, κ-alumina and other morphologically different ones. Further, there is one so-called fumed alumina from the method for its preparation.

Cerium oxide includes trivalent and tetravalent ones from its oxidation number, and it includes hexagonal system, tesseral system and face centered cubic system ones from its crystal system.

Zirconium oxide includes monoclinic system, tetragonal system and amorphous ones from its crystal system. Further, there is one so-called fumed zirconia from the method for its preparation. Further, there are so-called partially stabilized zirconia having calcium, magnesium or yttrium solid-solubilized to stabilize part of crystals as a cubic system, and completely stabilized zirconia having the solid-solubilized amount of such an element increased to completely stabilize all crystals as a cubic system.

Titanium oxide includes titanium monoxide, dititanium trioxide, titanium dioxide and other types from its crystal system. Further, there is one so-called fumed titania from the method for its preparation.

Silicon nitride includes α-silicon nitride, β-silicon nitride, amorphous silicon nitride and other morphologically different ones.

Silicon carbide also includes α-type and β-type.

Manganese dioxide includes α-manganese dioxide, β-manganese dioxide, γ-manganese dioxide, δ-manganese dioxide, ε-manganese dioxide, η-manganese dioxide and other morphologically different ones from its morphology.

For the polishing composition of the present invention, these abrasives may be employed optionally in combination as the case requires. When they are used in combination, the manner of the combination or their proportions, are not particularly limited.

Among these abrasives, it is preferred to employ an abrasive in a colloidal state with a uniform small particle size in order to reduce precipitation of the abrasive in the polishing composition during the storage and to prevent formation of scratches on the object to be polished, due to the abrasive. Namely, when silicon dioxide is used as an abrasive, it is preferably fumed silica and/or colloidal silica, and when alumina is employed, it is preferably fumed alumina and/or colloidal alumina.

The above-described adhesives are intended to polish the surface to be polished by the mechanical action as abrasive grains. Among them, the particle size of silicon dioxide is usually from 0.015 to 0.05 μm, preferably from 0.02 to 0.04 μm as an average particle size observed by a scanning electron microscope, and the specific surface area measured by a BET method is usually from 50 to 150 m²/g, preferably from 70 to 120 m²/g. Likewise, the particle size of aluminum oxide, zirconium oxide, titanium oxide, silicon nitride, silicon carbide or manganese dioxide, is usually from 0.03 to 0.1 µm, preferably from 0.05 to 0.08 µm, as an average particle size observed by a scanning electron microscope, and the specific surface area measured by BET method is usually from 20 to 90 m²/g, preferably from 30 to 70 m²/g.

If the average particle sizes of these abrasives exceed the above respective ranges or if the specific areas are smaller than the above respective ranges, the mechanical polishing action will increase, and the rate of polishing the insulating layer will increase, whereby the selectivity ratio tends to be small, the surface roughness of the polished surface tends to increase, or scratches tend to form. On the other hand, if the average particle sizes are smaller than the respective ranges, or the specific surface areas are larger than the respectively ranges, the mechanical polishing action will decrease, whereby the stock removal rate against the tantalum-containing compound layer or the copper layer tends to be low.

The content of the abrasive in the polishing composition of the present invention is usually from 10 to 200 g/l, preferably from 30 to 100 g/l, based on the polishing composition. If the content of the abrasive is too small, the mechanical polishing power decreases, whereby the rate of polishing the insulating layer decreases, but the rate of polishing the tantalum-containing compound layer will also decrease, and consequently, the selectivity ratio tends to be small, such being undesirable. On the other hand, if the content of the abrasive is too large, the mechanical polishing power increases, and the rates of polishing not only the copper layer and the tantalum-containing compound layer but also the insulating layer, will increase, whereby the selectivity ratio tends to be small, or control of the stock removal rate of e.g. the copper layer is likely to be difficult, and due care will be required.

Oxidizing Agent

The polishing composition of the present invention contains an oxidizing agent which is capable of oxidizing a tantalum-containing compound. Here, the tantalum-containing compound includes not only metal tantalum but also tantalum nitride. In the polishing composition of the present invention, the performance required for the oxidizing agent is to oxidize the tantalum-containing compound layer on one hand and to oxidize the surface of the copper layer to form a brittle oxide layer, on the other hand. More importantly, it has a nature scarcely react directly with the reducing agent which will be described hereinafter. Namely, during the polishing, it is important to preferentially oxidize the surface of the object to be polished.

As oxidizing agents useful for the polishing composition of the present invention, hydrogen peroxide, iron(III)salts, cerium(IV)salts and carboxylic acids may be mentioned. However, among carboxylic acids, formic acid and oxalic acids have no action as an oxidizing agent, and as described hereinafter, they act as reducing agents. Accordingly, they are excluded from the oxidizing agents. On the other hand, relatively strong oxidizing agents such as permanganates or dichromates, are not desirable, since they are likely to directly react with the reducing agent. It should be mentioned that the tantalum-containing compound is a substance which is relatively easily oxidized, and it may be oxidized even by an oxidizing agent having a relatively weak oxidizing power or by a small amount of an oxidizing agent. Specifically, such an oxidizing agent may, for example, be hydrogen peroxide, iron nitrate, iron sulfate, ammonium iron sulfate, cerium sulfate, ammonium cerium sulfate, citric acid, succinic acid, malonic acid, malic acid, acetic acid, butyric acid, valeric acid or lactic acid.

Among them, hydrogen peroxide is particularly preferred as the oxidizing agent to be used for the present invention. Hydrogen peroxide contains no metal iron and is less likely to contaminate a semiconductor device, and it yet has an adequate oxidizing power for oxidizing the tantalum-containing compound.

The content of the oxidizing agent in the polishing composition of the present invention is preferably from 0.002 to 1 mol/l, more preferably from 0.01 to 0.1 mol/l. In general, if the content of the oxidizing agent is larger than this minimum amount, a practical stock removal rate (from 300 to 1,000 Å/min) against the tantalum-containing compound layer can be obtained. If the content of the oxidizing agent is too small, the oxidizing action against the tantalum-containing compound layer tends to be small, and not enough polishing power may sometimes be obtained. On the other hand, if the content of the oxidizing agent is too large, polishing of the tantalum-containing compound layer can be carried out adequately, but control of polishing against the copper layer tends to be difficult, whereby surface damages such as recesses, dishing or erosion, are likely to form, and due care will be required.

Reducing Agent

The polishing composition of the present invention contains a reducing agent which is capable of reducing tantalum oxide formed by the above-described oxidizing agent.

The reducing agent useful for the polishing composition of the present invention may, for example, be formic acid, oxalic acid or formaldehyde. These reducing agents are considered to perform a role of reducing the surface of the tantalum-containing compound layer oxidized by the oxidizing agent. The reducing agent of the present invention is preferably one which will not react directly with the coexisting oxidizing agent and which preferentially reduces the surface of the polished object which was oxidized during the polishing. Accordingly, a relatively strong reducing agent such as a sulfide or a boron compound is not preferred, since such a reducing agent is likely to directly react with the oxidizing agent, and its toxicity is strong.

Among them, oxalic acid is particularly preferred as the reducing agent to be used for the present invention. The content of the reducing agent in the polishing composition of the present invention is preferably from 0.002 to 0.1 mol/l, preferably from 0.005 to 0.05 mol/l. In general, if the content of the reducing agent is larger than this minimum amount, a practical stock removal rate (from 300 to 1,000 Å/min) against the tantalum-containing compound layer can be obtained. If the content of the reducing agent is too small, the reducing action will be small, and as a result, the rate of polishing the tantalum-containing compound layer tends to be low. On the other hand, if the content of the reducing agent is too large, the reducing action will be too large, and the rate of polishing the copper layer tends to be small. Further, oxalic acid also has toxicity, and its excessive incorporation is not desirable. Further, oxalic acid has a function to suppress decomposition of hydrogen peroxide, whereby the storage stability of the polishing composition will be improved.

Further, in a case where it is necessary to control the stock removal rates of the tantalum-containing compound layer and the copper layer, it is preferred to set the contents of the oxidizing agent and the reducing agent to satisfy the following formula:

$X - 0.0002 \leq Y$ wherein X is the content (mol/l) of the oxidizing agent, based on the polishing composition, and Y is the content (mol/l) of the reducing agent, based on the polishing composition.

In this case, the stock removal rates of the tantalum-containing compound layer and the copper layer will be substantially the same, whereby it is possible to uniformly polish the surface to be polished, comprising the tantalum-containing compound and the copper layer present as a wiring portion. Further, by reducing the content of the oxidizing agent of the above formula, or by increasing the content of the reducing agent, it is possible to mend the surface damages such as recesses, dishing or erosion, controlled by the first polishing.

Chelating Compound

The polishing composition of the present invention preferably further contains a chelating compound which exhibits a chelating action to copper. The copper layer is a material which can be relatively easily polished, but the amount to be polished is the largest in the polishing process for the semiconductor device, and accordingly a high stock removal rate is required. Therefore, it is preferred to further improve the stock removal rate against the copper layer by a further addition of a chelating compound to the polishing composition comprising the abrasive, the oxidizing agent and the reducing agent.

Chelating compounds useful for the polishing composition of the present invention include, for example, ethylenediamine, diethylenetriamine, triethylenetetramine, tetraethylenepentamine, pentaethylenehexamine, glycine, ethylenediamine tetraacetic acid, diethylenetriamine pentaacetic acid, triethylenetetramine hexaacetic acid, nitrilotriacetic acid, ammonium hydroxide, etc. Among them, ethylenediamine is preferred. Ethylenediamine forms a chelating bond to a copper atom relatively easily, whereby a high stock removal rate can be obtained.

The content of the chelating compound in the polishing composition of the present invention is usually from 0.005 to 0.05 mol/l. If the content of the chelating compound is too small, the rate of polishing the copper layer tends to be small. On the other hand, if the content of the chelating compound is too much, the rate of polishing the copper layer tends to be excessive, whereby not only control tends to be difficult but also surface damages such as dishing are likely to be brought about. Accordingly, due care is required.

Piperazine

It is preferred that the polishing composition of the present invention further contains piperazine. Piperazine acts on the surface of the copper layer during polishing and thereby prevents formation of surface damages such as recesses, dishing or erosion, and it also serves to protect the polished surface and contributes to accomplishing a mirror-finished surface.

When piperazine is to be added to the polishing composition of the present invention, it is preferred that the oxidizing agent is hydrogen peroxide, and the reducing agent is oxalic acid. When the polishing composition of the present invention comprises an abrasive, hydrogen peroxide, an acidic reducing agent such as oxalic acid, piperazine and water, due to a neutralization reaction of the reducing agent with piperazine, the content of oxalic acid which practically acts as a reducing agent, will be a content obtained by subtracting the content of piperazine from the oxalic acid (hereinafter referred to as "the content of effective reducing agent"). Here, it is usually advisable to set the contents of hydrogen peroxide and oxalic acid so that all of the following formulae are satisfied:

$$0.002 \leq X \leq 0.025 \quad (a)$$

$$0.002 \leq Z \leq 0.05 \quad (b)$$

$$2.5X - 0.011 \leq Z \quad (c)$$

$$Z = Y - P(\text{content of effective reducing agent}) \quad (d)$$

wherein X, Y and P are the contents (mol/l) of the oxidizing agent, the reducing agent and the piperazine, respectively, based on the polishing composition.

When a reducing agent which is not acidic (such as formaldehyde) is to be employed, the content of effective reducing agent will be equal to the usual content. In this case, if the contents of the oxidizing agent, the reducing agent and the piperazine are at least the minimum contents which satisfy the formulae (a) to (d), the stock removal rate of the tantalum-containing compound will be substantially constant, like the case where no piperazine is incorporated. These minimum contents are also contents which make it possible to polish the tantalum-containing compound at a practical rate (from 300 to 1,000 Å/min) in the CMP process for a semiconductor device comprising the tantalum-containing compound and copper. Accordingly, if the contents of these oxidizing agent, reducing agent and piperazine are too small, the stock removal rate of the tantalum-containing compound layer tends to be small, such being not practical. On the other hand, if the content of the oxidizing agent is too large, control of polishing tends to be difficult, and surface damages such as dishing, erosion or recesses are likely to form, although the stock removal rate against the copper layer may increase. On the other hand, if the content of the reducing agent is too large, the abrasive tends to aggregate, whereby the viscosity of the composition tends to increase, and the handling tends to be difficult, and scratching is likely to result, such being undesirable.

Water

The medium of the polishing composition of the present invention is water. Water is preferably one having impurities reduced as far as possible, so that the above-mentioned components can precisely perform their roles. Namely, water is preferably distilled water. Water is also one having impurity ions removed by an ion exchange resin and having suspended matters removed by a filter.

Polishing Composition

The polishing composition of the present invention is prepared usually by mixing, dissolving or dispersing the above-described respective components, i.e. the abrasive, the oxidizing agent and the reducing agent, and, if required, a chelating compound, in water. Here, methods for mixing, dissolving or dispersing are optional. For example, stirring by a vane-type stirrer or supersonic dispersion may be employed. By such a method, soluble components will be dissolved and insoluble components will be dispersed, whereby the composition will be a uniform dispersion.

The polishing composition of the present invention may further contain a pH-adjusting agent to adjust the pH, various surfactants and other additives, as the case requires.

In the present invention, the pH-adjusting agent is used to improve the stability of the polishing composition, to improve the stability in use or to meet the requirements of various regulations. As a pH-adjusting agent employed to lower the pH of the polishing composition of the present invention, hydrochloric acid, nitric acid, sulfuric acid or the like, may be mentioned. On the other hand, one to be used for the purpose of increasing the pH, ammonia, potassium hydroxide, sodium hydroxide or the like, may be mentioned. The polishing composition of the present invention is not particularly limited with respect to the pH, but it is usually prepared to have a pH of from 1 to 7.

The surfactants include, for example, a dispersing agent, a wetting agent, a thickener, a defoaming agent, a foaming and a water repellent. As a surfactant to be used as a dispersant, it is common to employ a surfactant of sulfonic acid type, phosphoric acid type, carboxylic acid type or nonionic type.

For the preparation of the polishing composition of the present invention, there is no particular restriction as to the order of mixing the various additives or the mixing method.

The polishing composition of the present invention may be prepared, stored or transported in the form of a stock solution having a relatively high concentration, so that it may be diluted for use at the time of actual polishing operation. The above-mentioned preferred range for the concentration is one for the actual polishing operation. Needless to say, in the case of adopting such a method of use, the stock solution during the storage or transportation is a solution having a higher concentration.

Further, hydrogen peroxide has a characteristic such that it decomposes in the presence of metal ions, ammonium ions or an amine. Accordingly, in the polishing composition of the present invention, it is advisable to add and mix it to the polishing composition immediately prior to the actual use for polishing operation. Such decomposition of hydrogen peroxide can be suppressed by incorporating a carboxylic acid or alcoholic molecules. Namely, it is possible to suppress decomposition of hydrogen peroxide by the above-mentioned oxalic acid. However, such decomposition will be influenced also by the storage environment, and there is a possibility that part of hydrogen peroxide undergoes decomposition due to a temperature change during transportation or due to formation of a stress. Accordingly, it is preferred to carry out the mixing of hydrogen peroxide immediately before polishing.

Polishing Mechanism

By the polishing composition of the present invention, polishing can be carried out at a higher stock removal rate of the tantalum-containing compound layer, which used to be difficult to polish. The polishing mechanism has not yet been clearly understood, but may be explained as follows.

When the polishing composition of the present invention is brought in contact with the tantalum-containing compound layer, an oxidizing reaction and a reducing reaction may simultaneously or alternately proceed on its surface. Namely, the oxidizing agent oxidizes the surface of the tantalum-containing compound layer, and the reducing agent reduces the formed tantalum oxide. "A tantalum-containing compound layer in a readily polishable state" formed spontaneously by such a redox cycle, will be polished by the polishing composition of the present invention, whereby it becomes possible to accomplish a high stock removal rate against the tantalum-containing compound. In the CMP processing employing a conventional polishing composition, an oxidizing action used to be a central polishing mechanism, and if such CMP processing is applied to a tantalum-containing compound layer, polishing has been difficult due to the oxidized layer formed on its surface. Whereas, according to the polishing composition of the present invention, it is possible to carry out the CMP processing of the tantalum-containing compound layer at a high stock removal rate.

Now, the polishing composition of the present invention will be described in further detail with reference to Examples. However, it should be understood that the present invention is by no means restricted to such specific Examples.

EXAMPLES 1 to 16 and COMPARATIVE EXAMPLE 1 to 3

Preparation of Polishing Compositions

A predetermined amount of fumed silica (primary particle size: 0.03 μm, specific surface area: 90 m²/g) as an abrasive, was dispersed in water to prepare a slurry. Then, to this slurry, hydrogen peroxide, oxalic acid and ethylenediamine were added and mixed in the proportions as identified in Table 1. In this manner, polishing compositions of Examples 1 to 16 and Comparative Examples 1 to 3 were prepared. Further, hydrogen peroxide was mixed immediately prior to polishing.

Polishing Tests

As objects to be polished, a 6-inch silicon wafer having a copper layer formed in a thickness of about 10,000 Å by sputtering, a 6-inch silicon wafer having a tantalum layer formed in a thickness of about 2,000 Å by sputtering and a 6-inch silicon wafer having a silicon dioxide layer formed in a thickness of about 10,000 Å by a heat oxidation method, were used, and the layer-formed side of each wafer was polished.

Polishing was carried out by means of a one side polishing machine (table diameter: 570 mm). To the table of the polishing machine, a laminated polishing pad made of polyurethane (IC-1000/Suba400, manufactured by Rodel Inc., U.S.A.) was bonded. Firstly, the copper layer-attached wafer was mounted and polished for one minute, and then it was changed to the tantalum layer-attached wafer, which was likewise polished for one minute, and finally changed to the silicon dioxide layer-attached wafer, which was likewise polished for 3 minutes. The polishing conditions were such that the polishing pressure was 490 g/cm², the table rotational speed was 40 rpm, the feed rate of the polishing composition was 150 cc/min, and the rotational speed of the wafer was 40 rpm.

After the polishing, the wafers were sequentially washed and dried, whereupon the thickness reduction of the layer of each wafer by polishing was measured at 49 points, whereby the stock removal rates in the respective tests were obtained. The obtained results were as shown in Table 1.

TABLE 1

|  | Abrasive | Hydrogen peroxide | Oxalic acid | Chelating compound | Stock removal rate (Å/min) | | |
| --- | --- | --- | --- | --- | --- | --- | --- |
|  | (g/l) | (g/l) | (g/l) | (g/l) | Cu | Ta | SiO$_2$ |
| Example 1 | 5 | 0.05 | 0.02 | 0.02 | 2,020 | 310 | 31 |
| Example 2 | 10 | 0.05 | 0.02 | 0.02 | 3,900 | 480 | 77 |
| Example 3 | 200 | 0.05 | 0.02 | 0.02 | 6,750 | 970 | 210 |
| Example 4 | 250 | 0.05 | 0.02 | 0.02 | 7,730 | 1,160 | 250 |
| Example 5 | 100 | 0.005 | 0.02 | 0.02 | 2,470 | 690 | 173 |
| Example 6 | 100 | 0.01 | 0.02 | 0.02 | 3,960 | 780 | 169 |
| Example 7 | 100 | 1 | 0.02 | 0.02 | 6,930 | 830 | 179 |

TABLE 1-continued

|  | Abrasive (g/l) | Hydrogen peroxide (g/l) | Oxalic acid (g/l) | Chelating compound (g/l) | Stock removal rate (Å/min) | | |
| --- | --- | --- | --- | --- | --- | --- | --- |
|  |  |  |  |  | Cu | Ta | SiO$_2$ |
| Example 8 | 100 | 2 | 0.02 | 0.02 | 7,760 | 610 | 175 |
| Example 9 | 50 | 0.05 | 0.002 | 0.02 | 5,320 | 200 | 154 |
| Example 10 | 50 | 0.05 | 0.005 | 0.02 | 5,370 | 410 | 149 |
| Example 11 | 50 | 0.05 | 0.05 | 0.02 | 4,770 | 880 | 143 |
| Example 12 | 50 | 0.05 | 0.1 | 0.02 | 4,150 | 860 | 154 |
| Example 13 | 80 | 0.05 | 0.02 | 0.002 | 1,110 | 910 | 171 |
| Example 14 | 80 | 0.05 | 0.02 | 0.005 | 4,460 | 850 | 162 |
| Example 15 | 80 | 0.05 | 0.02 | 0.05 | 7,970 | 860 | 169 |
| Example 16 | 80 | 0.05 | 0.02 | 0.1 | 10,400 | 850 | 157 |
| Comparative Example 1 | 0 | 0.05 | 0.02 | 0.02 | 520 | 51 | 20 |
| Comparative Example 2 | 50 | 0 | 0.0 | 0.02 | 770 | 610 | 150 |
| Comparative Example 3 | 50 | 0.05 | 0 | 0.02 | 5,690 | 79 | 153 |
| Comparative Example 4 | 50 | 0.05 | 0.02 | 0 | 850 | 580 | 160 |

EXAMPLES 17 to 22

As an abrasive, fumed silica, colloidal silica or fumed alumina, having a primary particle size and a specific surface area as identified in Table 2, was dispersed in water to prepare a slurry. To this slurry, hydrogen peroxide, oxalic acid and ethylenediamine were added and mixed in the proportions as identified in Table 2. In this manner, polishing compositions of Examples 17 to 22 were prepared. The contents of the respective components were 60 g/l of the abrasive, 0.05 mol/l of the oxidizing agent, and 0.02 mol/l of each of the reducing agent and the chelating compound. Further, hydrogen peroxide was mixed immediately prior to polishing, in the same manner as in Examples 1 to 16.

TABLE 2

|  | Abrasive | Primary particle size (nm) | Specific surface (m$^2$/g) | Stock removal rate (Å/min) | | |
| --- | --- | --- | --- | --- | --- | --- |
|  |  |  |  | Cu | Ta | SiO$_2$ |
| Example 17 | Fumed silica | 80 | 30 | 5,780 | 860 | 193 |
| Example 18 | Fumed silica | 50 | 50 | 5,710 | 850 | 156 |
| Example 19 | Fumed silica | 17 | 150 | 4,090 | 710 | 49 |
| Example 20 | Fumed silica | 12 | 200 | 2,880 | 380 | 20 |
| Example 21 | Colloidal alumina | 40 | 70 | 4,180 | 680 | 72 |
| Example 22 | Fumed alumina | 30 | 85 | 4,830 | 604 | 117 |

From the results shown in Tables 1 and 2, it is evident that with the polishing compositions of the present invention, the rate of polishing the copper layer and the tantalum-containing compound layer is high by the actions of both the oxidizing agent and the reducing agent, as compared with a polishing composition not containing either hydrogen peroxide or oxalic acid, and the rate of polishing the silicon dioxide layer is suppressed to a low level. Further, it is evident that the stock removal rate against the copper layer is further improved by the action of the chelating compound. Although not shown in the Tables, no surface damages were observed in any Example, when these polished surfaces were visually inspected.

EXAMPLES 23 to 41 and COMPARATIVE EXAMPLES 5 to 12

Preparation of Polishing Compositions

As an abrasive, a predetermined amount of colloidal silica (primary particle size: 0.035 μm, specific surface area: 80 m$^2$/g) or fumed silica (primary particle size: 0.03 μm, specific surface area: 90 m$^2$/g) was dispersed in water to prepare a slurry. Then, to this slurry, hydrogen peroxide, oxalic acid and piperazine were added and mixed in the proportions as identified in Table 1. In this manner, polishing compositions of Examples 23 to 41 and Comparative Examples 5 to 12 were prepared. Further, hydrogen peroxide was mixed immediately prior to polishing.

Polishing Tests

As objects to be polished, a 6-inch silicon wafer having a copper layer formed in a thickness of about 10,000 Å by sputtering, a 6-inch silicon wafer having a tantalum layer formed in a thickness of about 2,000 Å by sputtering and a 6-inch silicon wafer having a silicon dioxide layer formed in a thickness of about 10,000 Å by a heat oxidation method, were used, and the layer-formed side of each wafer was polished.

Polishing was carried out by means of a one side polishing machine (table diameter: 570 mm). To the table of the polishing machine, a laminated polishing pad made of polyurethane (IC-1000/Suba400, manufactured by Rodel Inc., U.S.A.) was bonded. Firstly, the copper layer-attached wafer was mounted and polished for one minute, and it was then changed to the tantalum layer-attached wafer which was likewise polished for one minute. The polishing conditions were such that the polishing pressure was 4,900 g/cm$^2$, the table rotational speed was 40 rpm, the feed rate of the polishing composition was 150 cc/min, and the rotational speed of each wafer was 40 rpm.

After the polishing, the wafers were sequentially washed and dried, whereupon the thickness reduction of the layer of each wafer by polishing was measured at 49 points, whereby the stock removal rates in the respective tests were obtained. The obtained results were as shown in Table 3.

TABLE 3

| | Abrasive (g/l) | Oxidizing agent (mol/l) | Reducing agent (mol/l) | PIZ* (mol/l) | Stock removal rate (Å/min) Cu | Ta |
|---|---|---|---|---|---|---|
| Example 23 | CS* | 50 | 0.2 | 0.2 | 0 | 689 | 724 |
| Example 24 | CS | 50 | 0.1 | 0.1 | 0 | 685 | 715 |
| Example 25 | CS | 50 | 0.05 | 0.1 | 0 | 388 | 666 |
| Example 26 | CS | 50 | 0.05 | 0.05 | 0 | 673 | 728 |
| Example 27 | CS | 50 | 0.02 | 0.05 | 0 | 293 | 705 |
| Example 28 | CS | 50 | 0.01 | 0.01 | 0 | 667 | 676 |
| Example 29 | CS | 50 | 0.002 | 0.01 | 0 | 198 | 666 |
| Example 30 | CS | 50 | 0.001 | 0.01 | 0 | 99 | 713 |
| Example 31 | CS | 50 | 0.002 | 0.002 | 0 | 387 | 418 |
| Example 32 | CS | 50 | 0.001 | 0.002 | 0 | 191 | 397 |
| Example 33 | CS | 50 | 0.03 | 0.2 | 0.1 | 396 | 475 |
| Example 34 | FS* | 50 | 0.02 | 0.1 | 0.05 | 437 | 493 |
| Example 35 | FS | 80 | 0.006 | 0.01 | 0.005 | 439 | 445 |
| Example 36 | FS | 80 | 0.002 | 0.01 | 0.005 | 338 | 429 |
| Example 37 | FS | 80 | 0.001 | 0.01 | 0.005 | 145 | 440 |
| Example 38 | FS | 80 | 0.002 | 0.004 | 0.002 | 196 | 305 |
| Example 39 | FS | 80 | 0.001 | 0.004 | 0.002 | 145 | 310 |
| Example 40 | CS | 10 | 0.01 | 0.01 | 0 | 288 | 309 |
| Example 41 | CS | 200 | 0.01 | 0.01 | 0 | 678 | 988 |
| Comparative Example 5 | CS | 50 | 0.15 | 0.1 | 0 | 1,526 | 729 |
| Comparative Example 6 | CS | 50 | 0.07 | 0.05 | 0 | 1,192 | 726 |
| Comparative Example 7 | CS | 50 | 0.02 | 0.01 | 0 | 1,579 | 706 |
| Comparative Example 8 | CS | 50 | 0.004 | 0.002 | 0 | 995 | 405 |
| Comparative Example 9 | CS | 50 | 0.02 | 0.05 | 0 | 240 | 249 |
| Comparative Example 10 | FS | 50 | 0.03 | 0.1 | 0.05 | 768 | 493 |
| Comparative Example 11 | FS | 50 | 0.01 | 0.01 | 0.005 | 1,181 | 456 |
| Comparative Example 12 | CS | 5 | 0.01 | 0.01 | 0 | 196 | 100 |

*CS: Colloidal silica
FS: Fumed silica
PIZ: Piperazine

From the results shown in Table 3, it is evident that with the polishing compositions of the present invention, the tantalum layer can be polished at a practical stock removal rate (from 300 to 1,000 Å/min) by optimizing the contents of both the oxidizing agent and the reducing agent, and the stock removal rate of the copper layer may also be set at a level lower than the stock removal rate of the tantalum layer. Although not shown in the Table, no surface damages were observed in any Example, when these polished surfaces were visually inspected.

According to the present invention, it is possible to provide a polishing composition which is capable of polishing a tantalum-containing compound layer at a high stock removal rate and whereby in the CMP process for producing a semiconductor device comprising a copper layer and a tantalum-containing compound layer on a substrate, the stock removal rates against the copper layer and the tantalum-containing compound layer are high, while the stock removal rate against the insulating layer is small, i.e. the selectivity ratio is large, and a polishing method employing such a composition, or a polishing composition whereby the stock removal rate against the tantalum-containing compound layer is high, and the stock removal rate against the copper layer is low and a polishing method employing such a composition. Thus, in the process for producing a semiconductor device, the semiconductor device can be produced in good yield.

What is claimed is:

1. A polishing composition comprising the following components:

(a) an abrasive, (b) an oxidizing agent capable of oxidizing tantalum, (c) a reducing agent capable of reducing tantalum oxide, which is oxalic acid, and (d) water, wherein the contents of the oxidizing agent and the reducing agent satisfy the following formulae, $$0.002 \leq X \leq 1$$

$$0.002 \leq Y \leq 0.1$$

wherein X is the content (mol/l) of the oxidizing agent, based on the polishing composition, and Y is the content (mol/l) of the reducing agent, based on the polishing composition; and wherein said composition is effective for removing tantalum from a substrate.

2. The polishing composition according to claim 1, wherein the abrasive is at least one member selected from the group consisting of silicon dioxide, aluminum oxide, cerium oxide, zirconium oxide, titanium oxide, silicon nitride, silicon carbide and manganese dioxide.

3. The polishing composition according to claim 1, wherein the abrasive is at least one member selected from the group consisting of fumed silica, colloidal silica, fumed alumina and colloidal alumina.

4. The polishing composition according to claim 1, wherein the abrasive has a primary particle size of from 0.015 to 0.05 μm and a specific surface area of from 50 to 150 m²/g, and the content of the abrasive is from 10 to 200 g/l, based on the polishing composition.

5. The polishing composition according to claim 1, wherein the oxidizing agent is at least one member selected from the group consisting of hydrogen peroxide, iron(III) salts, cerium(IV) salts and carboxylic acids other than formic acid and oxalic acid.

6. The polishing composition according to claim 1, wherein the oxidizing agent is hydrogen peroxide.

7. The polishing composition according to claim 1, which further contains a chelating compound showing a chelating action to copper.

8. The polishing composition according to claim 7, wherein the chelating compound is at least one member selected from the group consisting of ethylenediamine, diethylenetriamine, triethylenetetramine, tetraethylenepentamine, pentaethylenehexamine, glycine, ethylenediaminetetraacetic acid, diethylenetriaminepentaacetic acid, triethylenetetraminehexaacetic acid, nitrilotriacetic acid and ammonium hydroxide.

9. The polishing composition according to claim 7, wherein the content of the chelating compound is from 0.005 to 0.05 mol/l, based on the polishing composition.

10. The polishing composition according to claim 1, which further comprises piperazine.

11. The polishing composition according to claim 10, wherein the contents of the oxidizing agent, the reducing agent and the piperazine satisfy all of the following formulae:

$0.002 \leq X \leq 0.025$ $0.002 \leq Z \leq 0.05$ $2.5X - 0.01 \leq Z$ $Z = Y - P$ wherein X, Y and P are the contents (mol/l) of the oxidizing agent, the reducing agent and the piperazine, respectively, based on the polishing composition.

12. A polishing method for polishing a semiconductor device having a layer of copper and a layer of a tantalum-containing compound formed on a substrate, by means of a polishing composition comprising the following components:

(a) an abrasive, (b) an oxidizing agent capable of oxidizing tantalum, (c) a reducing agent capable of reducing tantalum oxide, which is oxalic acid, and (d) water, wherein the contents of the oxidizing agent and the reducing agent satisfy the following formulae, $0.002 \leq X \leq 1$ $0.002 \leq Y \leq 0.1$ wherein X is the content (mol/l) of the oxidizing agent, based on the polishing composition, and Y is the content (mol/l) of the reducing agent, based on the polishing composition; and wherein said composition is effective for removing tantalum from a substrate.

13. The polishing method according to claim 12, wherein the polishing composition further contains a chelating compound showing a chelating action to copper.

14. The polishing method according to claim 12, wherein the polishing composition further contains piperazine.

15. The polishing method according to claim 12, wherein the semiconductor device has a tantalum compound layer and a copper layer sequentially formed on an insulating layer having a pattern, and an excess copper layer on the outermost surface is removed by polishing.

* * * * *